United States Patent
Ziezold et al.

(10) Patent No.: US 10,126,142 B2
(45) Date of Patent: Nov. 13, 2018

(54) METHODS AND SYSTEMS FOR OBTAINING NAVIGATION INSTRUCTIONS

(71) Applicant: TomTom International B.V., Amsterdam (NL)

(72) Inventors: Hendrik Sebastian Ziezold, Amsterdam (NL); Michel Alders, Amsterdam (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 0 days.

(21) Appl. No.: 15/436,924

(22) Filed: Feb. 20, 2017

(65) Prior Publication Data

US 2017/0160097 A1  Jun. 8, 2017

Related U.S. Application Data

(63) Continuation of application No. 14/130,026, filed as application No. PCT/EP2012/062782 on Jun. 29, 2012, now Pat. No. 9,574,895.

(30) Foreign Application Priority Data

Jun. 30, 2011 (GB) .................................. 1111174.7

(51) Int. Cl.
*G01C 21/36* (2006.01)

(52) U.S. Cl.
CPC ...... *G01C 21/3644* (2013.01); *G01C 21/3611* (2013.01); *G01C 21/3626* (2013.01); *G01C 21/3629* (2013.01); *G01C 21/3635* (2013.01); *G01C 21/3641* (2013.01); *G01C 21/3655* (2013.01); *G01C 21/3664* (2013.01); *G01C 21/3667* (2013.01)

(58) Field of Classification Search
CPC ............ G01C 21/3644; G01C 21/3611; G01C 21/3629; G01C 21/3635; G01C 21/3641; G01C 21/3655; G01C 21/3664; G01C 21/3667
See application file for complete search history.

(56) References Cited

U.S. PATENT DOCUMENTS

| | | | |
|---|---|---|---|
| 8,515,674 B2 * | 8/2013 | Babetski ............ | G01C 21/3641 701/533 |
| 9,726,495 B1 * | 8/2017 | Basson .................. | G01C 21/34 |

FOREIGN PATENT DOCUMENTS

JP  2007232390 A  9/2007

* cited by examiner

Primary Examiner — Todd M Melton

(57) ABSTRACT

A user records a navigation instruction for a maneuver at a junction via their navigation device. The user indicates a distance before the junction at which the maneuver should be provided. The user does this by providing an input to the navigation device when a current position is at the relevant distance while driving around. The device then determines the maneuver in a digital map to be associated with the instruction by determining the next maneuver in a calculated route the user is following. The navigation device uploads the navigation instruction and the associated maneuver and distance to a central navigation instruction database. Other users may then download and use the navigation instruction.

22 Claims, 5 Drawing Sheets

METHODS AND SYSTEMS FOR OBTAINING NAVIGATION INSTRUCTIONS

CROSS-REFERENCES TO RELATED APPLICATIONS

This application is a continuation of U.S. patent application Ser. No. 14/130,026, filed Dec. 30, 2013, which is the National Stage of International Application No. PCT/EP2012/062782, filed on Jun. 29, 2012, and designating the United States. The application claims the benefit of United Kingdom Patent Application No. GB1111174.7 filed Jun. 30, 2011. The entire content of these applications is incorporated herein by reference.

The present invention relates to methods and systems for obtaining navigation instructions for use in a navigation system. The present invention also extends to methods and systems for providing navigation instructions in a navigation system. The present invention is particularly, although not exclusive applicable to navigation instructions based on visual cues.

Illustrative embodiments of the invention relate to portable navigation devices (so-called PNDs), in particular PNDs that include Global Positioning System (GPS) signal reception and processing functionality. The invention is also applicable to methods and systems including a navigation apparatus which forms part of an integrated navigation system, e.g. an in-vehicle navigation system. Other embodiments relate, more generally, to any type of processing device that is configured to execute navigation software so as to provide navigation functionality, and methods of operating such devices.

In accordance with the invention, the apparatus may be of any suitable form as discussed above, and in more detail below. One illustrative embodiment of the apparatus is a portable navigation device comprising the apparatus of the invention. Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like. PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO LIVE 950 or 1005 model manufactured and supplied by TomTom International B.V., provide a reliable means for enabling users to navigate from one position to another.

Although existing navigation apparatus are of great utility in guiding a user along a route, in some situations a user may have difficulty in interpreting conventional instructions regarding manoeuvres which must be performed in order to follow the route. Navigation instructions are usually provided in relation to certain locations along a route, e.g. junctions or decision points. Conventionally, navigation instructions were based upon a distance, instructing a user to take a particular action in a given distance, usually a distance to a junction. For example, one such navigation instruction might be to "turn left in 100 m" as described above. More recently, it has been recognised that instructions based upon visual cues may be more readily understood by a user, and may reduce the risk of overloading the user, leaving them free to concentrate on the primary activity of driving. For example, instructions may be provided by reference to landmarks, street names or street signs etc. One example of such a navigation instruction would be "turn left at the church". Such instructions are of particular utility in countries such as India or Turkey where navigation has traditionally been based upon landmarks than street names. These visual cue based navigation instructions are sometimes known as "Natural Instructions" or "Natural Voice Instructions" (NVI) on the basis that they resemble the type of instruction a person would naturally give when describing a route.

Although the use of navigation instructions based upon visual cues is known to be desirable, there are difficulties associated with implementing a visual cue based navigation system in practice. One problem is that a large number of new navigation instructions must be produced. Despite these difficulties, navigation systems utilising visual cue based navigation instructions have been proposed. Conventional systems of this type have derived the navigation instructions from digital map data. For example, map data may indicate the presence of a landmark, such as a church, at a junction, allowing a navigation instruction referring to the landmark to be generated. In other cases, an instruction may refer to a sign that, according to map data, is present at a junction, e.g. instructing a user to turn right at a crossing where they can go to Berlin. However, these systems still suffer from certain drawbacks. A visual cue ideally should be checked or provided by someone who has seen the environment in question. For example, map data may indicate the presence of a landmark at a junction, but the landmark may only be visible from certain directions or at certain times of year, e.g. when there are no leaves on trees. Another problem is that certain visual cues, e.g. referring to the presence of a particular type of shop, or coloured building, may quickly become outdated. Thus the validity of visual cues identified from digital map data may be questionable. A given cue may have changed or may not be visible under certain conditions. Relying upon digital map data to derive navigation instructions may require specific digital map data to be collected and requires that the digital map data is maintained to high levels of accuracy.

The Applicant has realised that there remains a need for improved methods and systems of obtaining navigation instructions, in particular, although not exclusively, navigation instructions based upon visual cues.

In accordance with a first aspect of the invention there is provided a method for obtaining navigation instructions for use in a navigation system, the method comprising;

a user providing to the navigation system a navigation instruction for a manoeuvre at a junction.

Thus, in accordance with the invention, rather than obtaining a navigation instruction from digital map data, a navigation instruction is obtained from a user of the navigation system. The navigation instruction may be stored for use in guiding the user and/or other users of the navigation system along a route as described below. As the instruction is obtained from a human user, advantages may be obtained in terms of accuracy, usefulness and comprehensiveness of the navigation instruction. In particular, the present invention provides a practical and efficient method by which useful visual cue based navigation instructions may be obtained. For example, a user will only base visual cues upon features which are in fact visible at the relevant location, and will try to formulate their instructions in a manner useful to themselves and/or other users. This may overcome certain drawbacks associated with conventional techniques of obtaining visual cue based navigation instructions which rely upon deriving cues from digital map data. In some circumstances, for example, digital map data might suggest basing a visual cue regarding a manoeuvre at a junction upon the presence of a landmark. However, it may not be apparent from the digital map data that the landmark is, in reality, not readily visible to someone approaching the junction at street level. Typically the validity of such digital map data based instructions can only be verified by a human. In practice it is not, however, realistic to check every digital map derived navigation instruction. The present invention may provide a more flexible and practical system for obtaining navigation instructions.

The present invention extends to a system for obtaining navigation instructions in accordance with the method of the invention in any of its aspects or embodiments. From a further aspect of the invention there is provided a system for obtaining navigation instructions for use in a navigation system, the system comprising; means for receiving a navigation instruction for a manoeuvre at a junction from a user.

The present invention in this further aspect may include any or all of the features described in relation to the other aspects or embodiments of the invention to the extent that they are not mutually exclusive. Where not explicitly described, the system may comprise means for carrying out any of the steps of the methods herein described, and conversely the methods may involve performing any of the steps said to be performed by the system. The same applies to any of the further aspects of the invention described herein.

It will be appreciated that any of the steps referred to in relation to these and any other aspects of the invention may be carried out by a set of one or more processors of the system. In embodiments, the system of the invention in any of its aspects may comprise a set of one or more processors arranged to carry out any of the steps or functions described. Thus the "means for" carrying out any of the steps herein described may be a set of one or more processors, and the term "means for may be replaced by the term "a set of one or more processors". It will be appreciated that the same or different sets of processors may be used to carry out different functions described.

The user may provide the navigation instruction to the navigation system in any suitable manner. In embodiments the user is a local user of the navigation system. In these embodiments the navigation instruction is provided locally by the user. The user may provide the navigation instruction via a user terminal.

In preferred embodiments the method comprises the user providing the navigation instruction via a navigation apparatus, and the system may comprise a navigation apparatus for receiving the navigation instruction from the user. The navigation apparatus may be any form of navigation apparatus. In accordance with any of the aspects or embodiments of the invention the apparatus may comprise a display for displaying a digital map to a user and a processor configured to access digital map data and cause a digital map to be displayed to a user via the display. The apparatus may further comprise a user interface operable by a user to enable the user to interact with the apparatus. One particular area of utility is in relation to portable navigation devices (PND). In embodiments, therefore, the navigation apparatus is a portable navigation device (PND). The invention is also applicable to navigation apparatus which is provided as part of an integrated navigation system. For example the apparatus may form part of an in-vehicle integrated navigation system. In other embodiments, the navigation apparatus may be implemented by means of an application of a processing device which does not form part of a specific navigation device. For example the invention may be implemented using a suitable computer system arranged to execute navigation software. The system may be a mobile or portable computer system e.g. a mobile telephone or laptop, or may be a desktop system.

Embodiments in which the navigation instruction is provided via a navigation apparatus are particularly advantageous, as the user may provide the instructions while driving around. This may result in more reliable and complete navigation instructions being obtained. Furthermore, as described below, the navigation apparatus may provide a convenient way of obtaining additional information to be associated with the navigation instruction e.g. regarding the manoeuvre with which the instruction is to be associated and information regarding a distance before the junction at which the navigation instruction should be provided. In preferred embodiments the user therefore provides the navigation instruction via a navigation apparatus while travelling. The user may do this while travelling around e.g. in the region of the junction or more preferably while following a pre-planned route under the guidance of the navigation apparatus.

However, it will be appreciated that the navigation instruction need not be provided by the user via a navigation apparatus of the system. The navigation instruction may be provided via any suitable application of a processing device which need not be capable of providing navigation functionality. For example, a user may provide the navigation instruction via a website. The user could provide navigation instructions when at home via a computing device or via a mobile computing apparatus. An application run on the computing device may enable the user to record navigation instructions and associate them with manoeuvres and junctions via a displayed digital map as will be described in more detail below. Thus in embodiments the user provides the navigation instruction via a user terminal which may or may not be a navigation apparatus.

In accordance with the invention in any of its embodiments, the navigation instruction may be of any suitable type that may be useful in a navigation system for guiding a user to make a manoeuvre at a junction. In embodiments the navigation instruction is for use in guiding a user along a route including the manoeuvre. For example, when a pre-planned route includes a particular manoeuvre at a junction, the relevant navigation instruction may be retrieved and used. Preferably the navigation instruction is a visual cue based navigation instruction. A visual cue based instruction may be by reference to any cue or cues that is/are or may be detected visually, such as the presence of a landmark, street name or a road sign. However, a visual cue may be any visible cue present in the environment, including a visible characteristic of a road or road network e.g. the end of a curve or slope in the road etc. In some embodiments the navigation instruction is with reference to one or more of a landmark, a road sign, a street name or a visible characteristic of a road or road network. As mentioned above, as the navigation instructions are obtained from users in accordance with the invention, rather than e.g. from digital map data, the user will naturally base their instruction upon what is actually visible when they provide the instruction, and will typically provide the navigation instruction in terms that are more intuitive or natural allowing the instruction to be followed with greater ease. For example, if a particular landmark is not visible on approaching a junction, the user will not refer to it. If a particular street name is not visible, the user will not refer to it. The user will be able to see road signs, and thus will be able to decide whether or not it is appropriate to refer to a road sign when formulating a navigation instruction, and if they choose to do so, will know what information is provided on the road sign and which may be referred to in the instruction. The user will naturally choose the most useful way of formulating a navigation instruction referring to one or more visual cues, for example based on one or more of a landmark, direction sign or street name.

The navigation instruction provided by the user is for a manoeuvre at a junction. In embodiments the navigation instruction is associated with a manoeuvre at a junction defined in a digital map. In this way, when a route includes a given manoeuvre, the associated navigation instruction may be obtained. Furthermore, when providing route guidance, the navigation instruction will be provided at a given distance before the junction in order to give time for someone being guided to note the instruction and take any necessary action. This may be referred to as the timing of the navigation instruction. In embodiments the navigation instruction is associated with an indication as to a distance before the junction at which the navigation instruction should be given. The distance may be a distance in a digital map.

In preferred embodiments the navigation instruction is therefore associated with i) a manoeuvre defined in a digital map, and preferably ii) an indication as to a distance before the junction at which the navigation instruction should be given. The indication ii) effectively provides timing information for providing the navigation instruction. This may be used when the navigation instruction is subsequently used during navigation along a pre-planned route. The indication ii) will typically be a position relative to the junction at which the navigation instruction is relevant, i.e. at which any visual cue may be seen, and when the junction is sufficiently proximate for the instruction to be useful. The indication ii) may be an indication of a distance in the digital map. The method may further comprise the step of associating the manoeuvre and/or indication of distance with a navigation instruction, and the system may comprise means for so doing. This step may be carried out by a navigation apparatus in preferred embodiments in which the navigation instruction is provided via a navigation apparatus.

It will be appreciated that the distance indication need not be in the form of a numerical distance, and may be any indication from which a distance to the junction may be derived. The indication may be of a position relative to the junction. For example, the distance indication may be provided indirectly by the user identifying a reference point, such as the position of a building in proximity to the junction or in a road leading to the junction, or marking a current position when the user is at a distance from the junction corresponding to that at which the navigation instruction should be provided. The indication may be associated with the navigation instruction in this form or may be converted into a distance value.

In preferred embodiments one or both of the manoeuvre and the indication as to distance to be associated with the navigation instruction are determined at least in part, and in embodiments entirely, on the basis of an input or inputs of the user who provides the navigation instruction. Particularly in embodiments in which the user does not provide the navigation instruction using a navigation apparatus, it will be appreciated that the manoeuvre and the indication of distance may be provided by the input or inputs of the user. In embodiments using a navigation apparatus the input or inputs of the user may be used by the navigation apparatus to determine the manoeuvre and/or distance indication, possibly in combination with other factors.

The indication or manoeuvre may be determined by a navigation apparatus. This is particularly applicable to preferred embodiments in which the navigation instruction is provided via a navigation apparatus. The indication and/or manoeuvre may then also be specified via the navigation apparatus. Preferably the input or inputs are to a navigation apparatus. A user will naturally be able to determine an appropriate timing for a navigation instruction as they approach a junction from their own experience and view, overcoming the problems associated with prior art techniques in which it was necessary to try to determine visual cues from digital map data.

In some embodiments, therefore, the method further comprises the user providing one or more inputs e.g. to a navigation apparatus on the basis of which one or both of a manoeuvre defined in a digital map and a distance before the junction at which the navigation instruction should be given are determined. The input(s) may be provided at the same time as providing the navigation instruction, or may even be the providing of a navigation instruction, or may be provided at a different time. For example, a user may provide an input on the basis of which a manoeuvre to be associated with the navigation instruction is identified and then record a navigation instruction in respect thereof or vice versa. An input upon which the indication as to distance is based may be provided at the same or a different time to the input upon which the manoeuvre identification is based. In embodiments the input or inputs provided by the user may be the providing of the navigation instruction. However, preferably the distance from the junction at which the navigation instruction is to be provided is determined on the basis of a separate input of the user to the providing of the navigation instruction.

The input or inputs on the basis of which the manoeuvre and/or distance information is determined may be provided by the user in any suitable manner. In preferred embodiments in which the navigation instruction is provided via a navigation apparatus, the input or inputs are provided by the user to the navigation apparatus. The input or inputs may be provided while the user is travelling.

It will be appreciated that the input or inputs may not directly provide the manoeuvre identification or distance information but may be any input or inputs from which the manoeuvre or distance information to be associated with the navigation instruction may be determined e.g. by the navigation apparatus, optionally using other information e.g. a planned or actual movement of a user. The information is then provided under the control of the user.

In some embodiments the method comprises obtaining the manoeuvre to be associated with navigation instruction and/or a distance from a junction at which the navigation instruction is to be provided, at least in part, from the planned or actual movement of the user. The manoeuvre and the distance indication may be determined solely from the planned or actual movement of the user or additionally on the basis of other factors e.g. an input or inputs of the user. Preferably the method comprises the user providing the navigation instruction via a navigation apparatus while travelling, and the navigation apparatus obtaining the manoeuvre and/or the distance. In embodiments the manoeuvre to be associated with the navigation instruction and/or a distance from a junction at which the manoeuvre is to be provided are determined based on one or both of an input or inputs of the user and the planned or actual movement of the user. In some embodiments the manoeuvre is determined from the current or planned travel and the distance to the junction from an input or inputs of the user.

For example, in one embodiment a navigation apparatus could automatically determine a position of the user at the time when a navigation instruction is provided and use the determined position to obtain the distance from the junction at which the navigation instruction is to be provided. The distance of the determined position from the junction could be taken as the distance.

In some preferred embodiments the method comprises the user providing an input to a navigation apparatus when a current position corresponds to the distance before the junction at which the navigation instruction is to be given to thereby indicate the distance before the junction at which the instruction is to be given for association with the navigation instruction. It will be appreciated that the input may be used to indicate a provisional distance for launching the navigation instruction. The user may be offered the opportunity to modify the indicated distance at a later stage. For example, the user may only be able to provide an indication as to the approximate position during travel to avoid interfering with the primary task of driving, but may have the opportunity to review the indicated distance subsequently and modify it if needed. In preferred embodiments the method comprises the user providing the input to the navigation apparatus when a current position is located at the distance before the junction at which the instruction is to be given while following a route planned e.g. calculated by the navigation apparatus, and the method then further comprises the navigation apparatus inferring the manoeuvre with which the navigation instruction is to be associated using the indicated current position and the planned route. The method may comprise the navigation apparatus taking a given e.g. next or previous manoeuvre along the planned route as the manoeuvre to be associated with the navigation instruction. Thus in these embodiments the manoeuvre is obtained from the planned travel of the user. The user may specify whether the previous or next manoeuvre is to be taken.

It will be appreciated that the (current) position of the user may be taken to be the (current) position of the navigation apparatus and vice versa. In embodiments in which the navigation apparatus is located in a vehicle, the position will be the position of the vehicle. The (current) position is indicated by a position e.g. GPS signal. In embodiments the navigation apparatus therefore comprises means for determining a current position of the apparatus, and the method may further comprise determining the current position of the apparatus. The method may comprise monitoring current position during travel along the route, preferably with the navigation apparatus carrying out this step, and the apparatus may comprise means for so doing. Such monitoring may be carried out intermittently or continually. Such position monitoring and determination may be carried out in any manner, for example using techniques conventional in route guidance using a navigation apparatus.

While it is particularly convenient for the navigation apparatus to determine the manoeuvre to be associated with a navigation instruction from a current position by reference to a planned e.g. calculated route as described above, the manoeuvre need not be determined in this way. For example, the user need not be following a planned route. The user may simply drive around their local area, recording navigation instructions for various manoeuvres. For example, manoeuvres in respect of which user provided navigation instructions are required may be indicated on a digital map, and users may then record instructions when they are travelling in the vicinity. A user may then not plan a route if they are travelling in familiar territory. In such cases the user may then additionally specify the manoeuvre while travelling or at a later stage. In some embodiments the method may comprise the user providing an input to the navigation apparatus when a current position is located at the distance before the junction at which the instruction is to be given, and the navigation apparatus inferring the manoeuvre with which the navigation instruction is to be associated from the subsequent travel e.g. of the user or navigation apparatus. Thus the navigation apparatus may infer that the user has performed a particular manoeuvre before or after indicating the current position, and may then take this manoeuvre as the manoeuvre to be associated with the navigation instruction. In these embodiments the manoeuvre is determined from the actual travel of the user and the indicated current position. As with the distance to the junction information, the user may have the opportunity to review and modify manoeuvre information that is obtained.

In embodiments, however obtained, the method may further comprise displaying to a user one or both of information identifying a manoeuvre defined in a digital map, and an indication as to a distance before the junction at which the navigation instruction should be given to be associated with the navigation instruction. This step may be carried out by a navigation apparatus. The user may then confirm that the information/identification may be associated with the instruction or otherwise make any modifications necessary before the information/identification is associated therewith.

It will be appreciated that information associated with a navigation instruction identifying a manoeuvre and/or a distance before a junction at which the instruction is to be provided need not be obtained using a navigation apparatus or during travel of a user. In other embodiments a user may provide navigation instructions and associated information at other time, for example via a website when they are at home or at least not travelling. The method may then comprise displaying a digital map to the user, and the user providing an indication of a manoeuvre defined in the digital map, and an indication as to a distance before the junction at which the navigation instruction should be given. The user may manually indicate the manoeuvre and distance using any suitable input or inputs. The user may rely upon memory, or pictures or movies taken while travelling or which are associated with the digital map to later provide the necessary information in this way.

It will be appreciated that in accordance with the invention in any of its embodiments the navigation instruction is in respect of a junction and may be associated with an indication of the junction to which it relates. The junction information may be provided by information identifying the manoeuvre or may be separate information. The indication of the junction may be provided e.g. by a user in any of the manners set out above.

In accordance with any or the embodiments of the invention, additional information may be associated with the navigation instruction, and the method may comprise associating such information with the instruction. Any additional information may be provided by the user. In some embodiments the additional information is associated with the navigation instruction under the control of the user. It will be appreciated that in addition or alternatively additional information may automatically be associated with a navigation instruction e.g. by a navigation apparatus or other apparatus of the navigation system. Some examples are given below.

In preferred embodiments one or more validity criteria for the navigation instruction are associated therewith, and are preferably provided by the user. The validity criteria define criteria under which the navigation instruction is valid i.e. in which it may be used to describe the manoeuvre at a junction. Validity criteria may include one or more of temporal, environmental, or positional validity criteria. The validity criteria may be used as a criteria in determining whether the navigational instruction may be used in a particular situation. For example, the navigation instruction may refer to a landmark which may only be visible e.g. from the specified distance relative to the junction, on a clear day, in certain seasons e.g. when leaves are not on trees, during daytime etc. By associating the navigation instruction with validity criteria, the system may use the navigation instruction only when the criteria is fulfilled e.g. during a route navigation. In some embodiments the validity criteria include one or more of a seasonal validity criterion, a weather condition criterion or a time criterion. Further validity criteria may relate to a range of positions for which the navigation instruction is valid. Thus while the user preferably provides an indication of a distance to a junction at which the instruction is to be provided, additionally the user may specify a range of positions in one or more directions over which the instruction is valid. This may be useful in the even that another user approaches the junction in a different direction, or only starts a journey closer to the junction, or where instructions are to be repeated on an approach to the junction.

It will be appreciated that a validity criterion may not necessarily be provided directly by a user. For example, a time stamp may be associated with a navigation instruction when provided. The system or a navigation apparatus via which the navigation instruction is provided may then associate the navigation information with a validity criterion derived using the timestamp. For example, if the timestamp indicates that the instruction was provided in the winter, the system may automatically associate the timestamp with a validity criterion which indicates that the instruction is valid in the given season, and may assign the navigation instruction an attribute indicating that it may not be valid in other seasons. When navigation instructions are later sought, those which are more clearly valid may be determined before instructions of more questionable validity are used. In some embodiments a navigation instruction is associated with a timestamp indicative of the time at which the instruction was provided.

In some embodiments information identifying a category of one or more visual cues referred to in the navigation instruction may be associated with the navigation instruction e.g. by a user. For example, a user may specify whether the instruction refers to one or more categories of visual cue such as a street name, directional sign or landmark. This may enable stored navigation instructions to be searched and only navigational instructions meeting certain criteria in relation to the nature of a visual cue referred to provided during subsequent navigation along a route.

In some embodiments information regarding a type of the navigation instruction may be associated with the navigation instruction. For example, the information may define a target user of the navigation instruction, a tone e.g. seriousness of the instruction, a level of detail of the instruction etc. Such information may be associated with the instruction by a user or in other ways e.g. using feedback by users of the instruction.

In preferred embodiments the navigation instruction is associated with information identifying the user who provided the instruction. This may be an identifier based on the identity of a navigation apparatus used to provide the instruction or a user account via which the instruction was provided. The information may be the identity of a person or an identity of a particular personal navigation apparatus. The association of this information with the navigation instruction may facilitate searching of a central database for navigation instructions provided by a particular user, and provides a way of allowing others to rate a particular provider of navigation instructions. The identity information may be associated automatically with the navigation instruction e.g. by a navigation apparatus.

In some embodiments a navigation instruction or a part thereof may be labelled e.g. by the user or automatically, and the method may comprise associating a label with the navigation instruction or a part thereof. Preferably this is carried out under the control of a user. A label may indicate a part of a navigation instruction that provides additional non essential information e.g. additional information that might be of interest to a tourist. In some embodiments a user associates a label with a part of the navigation instruction relating to a detour. The association of a label with a part of a navigation instruction means that when the instruction is later used, if desired, the labelled part may be omitted or disabled when the instruction is provided to or replayed to another user. For example another user may not wish to receive the additional content or detour option.

In accordance with the invention in any of its embodiments, the method comprises the system receiving the navigation instruction (and any associated information) provided by a user. In preferred embodiments the method comprises receiving the navigation instruction and any associated information at a central server of the navigation system, and the system may comprise a central server for receiving the instruction (and any associated information). The central server may alternatively be referred to as a "central controller". Associated information may be of any of the types described above e.g. a manoeuvre in a digital map, an indication as to distance before the junction at which the instruction should be given, one or more validity criteria or information identifying the nature of a visual cue referred to in the instruction, labels etc. Any one or ones of such information may be associated with the navigation instruction and transmitted e.g. uploaded or downloaded, or stored in association therewith as described below. Of course such information could be handled separately or associated at a different stage with the navigation instruction. References to the "navigation instruction" below in regard to storing or providing of the instruction to a user may refer to the navigation instruction or the navigation instruction and any associated information or any part of any associated information. In other words the reference may be to at least the navigation instruction. Associated information may be stored with the navigation instruction and provided with it to a user. It will be appreciated that not all associated information is necessarily provided to another user. For example while manoeuvre and distance before junction information are preferably provided with the instruction, other information e.g. relating to a type of the instruction might be stored with the instruction and used to select the instruction from the database and may not necessarily be provided with the instruction to a user. Thus references to at least the navigation instruction (and any associated information) may refer to at least the navigation instruction or the navigation instruction and optionally any associated information or subset thereof.

In preferred embodiments the method comprises uploading the navigation instruction (and any associated information) to the central server. It will be appreciated that the navigation instruction may be reformatted prior to uploading to the central server. For example, the instruction may be converted from an audio to a text format or may be subjected to a syntax or spelling check. Accordingly, in some embodiments the method comprises the step of uploading the navigation instruction (and any associated information) e.g. from a user terminal to a central server. In these embodiments the navigation instruction (and any associated information) is provided locally e.g. via a navigation apparatus or other user terminal. In other less preferred embodiments the navigation instruction may not be uploaded to a central server, and could be maintained locally e.g. on the navigation apparatus for use by the user who provided the instruction.

In accordance with the invention, the navigation instruction provided by the user is for use in a navigation system. The navigation instruction may be for use by one or more users of the navigation system. The navigation instruction may be used for guiding the or each user along a route involving the manoeuvre. In preferred embodiments the method comprises storing the navigation instruction (and any associated information) for use in the navigation system.

In some embodiments the navigation instruction may be usable only by the user that provides the navigation instruction, and the navigation instruction may then be stored so as to be usable only by that user of the system. For example, the navigation instruction (and any association information) may be stored such that it is accessible only by a navigation apparatus of the user, or only via a user account of the user. The navigation instruction may then be used by the user to replace a predefined instruction provided by the navigation system provider. In these embodiments, the navigation instruction may be stored locally. In some embodiments the navigation instruction may be stored by a navigation apparatus of the user e.g. in a memory thereof. However, preferably the navigation instruction (and any associated information) is usable by a plurality of users of the system, and is usable by other users of the system than the user that provided the instruction. In these embodiments the navigation instruction (and any associated information) is stored so as to be accessible by a plurality of users of the system including at least one, and preferably a plurality of other user of the system. In these embodiments the instruction is stored so as to be accessible to at least one, and preferably a plurality of other apparatus e.g. navigation apparatus of the system to that via which the navigation instruction was provided. The plurality of users may include the user that provided the instruction (and any associated information). The navigation instruction (and any associated information) may be stored so as to be accessible to a plurality of navigation apparatus of the system.

In preferred embodiments the navigation instruction (and any associated information) is stored centrally so as to be accessible to a plurality of users of the system. In embodiments, the navigation system comprises a central server and the navigation instruction (and any associated information) is stored by the central server. The navigation instruction (and any associated information) may be stored in a central navigation instruction database. The term "database" does not imply any particular structure between database entries or a database manager coordinating the database and may refer to any suitable set of data. In these embodiments the stored navigation instruction (and any associated information) may be accessible by a plurality of navigation apparatus of the system. The navigation instruction may then be transmitted or downloaded to a navigation apparatus of one or more other users of the system for use in guiding the user or users along a route. The navigation instruction and any associated information may be downloaded by a navigation apparatus of the or each further user or users.

It will be appreciated that in embodiments in which the navigation instruction (and any associated information) is stored centrally so as to be accessible to a plurality of users of the system the navigation instruction (and any associated information) may additionally be stored locally. In some embodiments the method therefore comprises storing the navigation instruction (and any associated information) locally, and in embodiments by a navigation apparatus of the user e.g. in a memory thereof, and/or storing the navigation instruction (and any associated information) centrally e.g. in a central navigation instruction database.

In accordance with the invention in any of its embodiments, the navigation instruction provided by the user may be a spoken and/or text instruction. Thus the instruction may comprise one or more of spoken and text components e.g. both spoken and text components or only spoken or only text instructions. Preferably the navigation instruction is a spoken or voice instruction. Preferably the step of the user providing the navigation instruction comprises the user recording a spoken navigation instruction. In preferred embodiments in which the method further comprises uploading the navigation instruction to a central server the method may comprise uploading the navigation instruction to the central server as an audio file. The navigation instruction may then be stored as an audio file. Alternatively the method may comprise converting the recorded spoken navigation instruction into a text format before uploading the instruction to the central server. This step may be carried out by a navigation apparatus or other user terminal to which the user provides the instruction. This may be done using suitable voice recognition software. The navigation instruction may then be stored as a text file. In other embodiments, it will be appreciated that the navigation instruction could be provided initially by the user in a written or text form. Such embodiments could be used in particular where the user provides the navigation instructions at a time other than when they are travelling e.g. via a user terminal at home, but are in general less preferred as they less compatible with the user being able to provide the instructions while on the move e.g. while driving.

It will be appreciated that the user referred to herein who provides the navigation instruction to the system is a user of a navigation system in the sense that they are at least registered with the system for providing navigation instructions. The user will typically also be a user who uses the navigation system for navigation purposes, for example, having a navigation apparatus which forms part of the system. However, it is envisaged that certain users might be users of the navigation system in relation to providing navigation instructions only and may not themselves use the system for obtaining navigation assistance. The user may not necessarily have a specific navigation apparatus and may simply provide instructions via a general computing apparatus. For example, people may be encouraged to register for providing navigation instructions for certain regions, e.g. where few user provided navigation instructions are yet available, in response to an advertisement on a website of the navigation system provider. Incentives may or may not be provided to encourage people to become "local guides" in this way. It is believed that the knowledge that other users are relying upon the navigation instructions they have provided may provide sufficient motivation for some people, especially where ratings or comments are posted by other users.

Although reference herein is made to a user providing "a" navigation instruction for a manoeuvre at a junction, it will be appreciated that a set of one or more navigation instructions may be provided for a given manoeuvre at a junction. In some embodiments a plurality of navigation instructions are provided by the user in respect of a given manoeuvre at a junction. For example, a user may provide a set of navigation instructions for use respectively at different distances from the junction as the junction is approached. Different visual cues may become apparent as the junction is approached, and additional instructions may provide reassurance to someone relying upon the instructions and/or aid preparation for the manoeuvre e.g. in terms of lane selection etc. In some embodiments a set of navigation instructions is provided in respect of a given manoeuvre at a junction, each being associated with an indication as to a distance before the junction when the instruction should be given. Each instruction may be associated with a different such indication. The indications may be of progressively lesser distances to the junction.

In preferred embodiments the method comprises a user providing a set of one or more navigation instructions in respect of each of a plurality of manoeuvres at one or more junctions. For example, a user may provide navigation instructions for each manoeuvre to be performed in order to follow a given route. In other embodiments a user may provide a set of navigation instructions in respect of each manoeuvre that may be performed at one or more junctions in a predefined region.

In accordance with the invention the navigation instruction obtained from the user is a complete navigation instruction. In other words, the instruction forms a complete instruction regarding an action to be taken by a user in order to enable them to perform a manoeuvre at a junction. Thus, in these embodiments the navigation instruction is obtained entirely from a user and is not derived in any part from digital map data. However, it is envisaged that rather than providing a complete navigation instruction, in other arrangements a user may provide only a partial navigation instruction e.g. a segment of a navigation instruction. In these embodiments a complete navigation may be obtained using additional information obtained from another source e.g. digital map data. For example, a user might indicate a landmark to be referred to in a navigation instruction which may then be created at least in part using generic instructions.

The present invention extends to the use of the navigation instruction(s) provided by a user or users of the navigation system in accordance with the invention in any of its embodiments. The method may comprise a navigation apparatus using the navigation instruction to guide a user along a planned route. The method may further comprise the navigation apparatus using information associated with the navigation instruction and indicating a distance from a junction at which the navigation instruction is to be provided to determine a timing for providing the navigation instruction to the user. As mentioned above, the user who uses the navigation instruction could be the same user who provided the instruction, although in preferred embodiments a navigation instruction is used by and hence provided to another user of the system. The instruction is therefore preferably provided to a user via a different apparatus e.g. navigation apparatus to the apparatus e.g. navigation apparatus via which it was initially provided.

While the present invention has been described by reference to "a user" providing the navigation instruction and any associated information, it will be appreciated that in preferred embodiments the method comprises a plurality of users providing navigation instructions in accordance with any of the aspects or embodiments of the invention. It will be appreciated that in preferred embodiments at least in which the navigation instructions and associated information are stored centrally e.g. in a central navigation instruction database, the navigation instructions may be accessible to a plurality of users or navigation apparatus of the system. The navigation instructions may be used in place of conventional navigation instructions when guiding a user along a planned route.

In some embodiments in which the navigation instruction or instructions are stored in a central navigation instruction database, the method further comprises providing a set of one or more navigation instructions from the central navigation instruction database including the or one or more of the instructions to at least one other user of the system i.e. a user other than the user or users who provided the one or more instructions. This step may be carried out by the central server where provided. The method may comprise providing the set of navigation instructions to an apparatus e.g. navigation apparatus of the user. The method comprises providing the set of navigation instructions to a different apparatus e.g. navigation apparatus of the system to the or each apparatus e.g. navigation apparatus via which they were provided. The set of navigation instructions is provided to an apparatus or user at a different time and/or place to the or each apparatus or user via which the instructions were provided to the database.

The method may comprise downloading or transmitting the set of one or more navigation instructions to the user or an apparatus e.g. navigation apparatus of the at least one other user. The downloading may take place over any suitable communications link, and will typically be a wireless transmission. It will be appreciated that providing the navigation instructions to a user may effectively result in the instructions being provided to an apparatus e.g. navigation apparatus of the user. The user may transfer the instructions to their navigation apparatus or otherwise cause them to be downloaded directly or indirectly thereto. Any reference to navigation instructions being downloaded to a user may be replaced by a reference to downloading to a navigation apparatus of a user and vice versa. It will be appreciated that references to downloading to a navigation apparatus herein refer to the direct or indirect downloading of the instructions to the navigation apparatus. For example the instructions may be downloaded to another apparatus e.g. mobile telephone or computer of the user, and then transferred to the navigation apparatus.

In some embodiments the navigation instruction is downloaded to a navigation apparatus of the other user, the navigation apparatus being different to a navigation apparatus via which the navigation instruction was provided to the system. In some embodiments the navigation instruction is downloaded to a navigation apparatus of the other user, the navigation apparatus being different to a navigation apparatus via which the navigation instruction was provided to the system. In some embodiments wherein a user provides the navigation instruction to the system using an apparatus, preferably a navigation apparatus, the method comprises downloading the navigation instruction to an apparatus, preferably a navigation apparatus of the other user, wherein the apparatus to which the instruction is downloaded is different to the apparatus via which the instruction was provided, the method optionally further comprising guiding the other user along a planned route using the navigation instruction.

The method may further comprise the navigation apparatus of the other user using the downloaded set of one or more navigation instructions to guide the user along a planned route.

If not specifically referred to herein, the navigation instruction or set of one or more instructions downloaded or provided to another user from the database herein includes at least one navigation instruction provided to the system by a user as described previously.

In accordance with a further aspect of the invention there is provided a method for obtaining and providing navigation instructions in a navigation system, the method comprising;

a user providing a navigation instruction for a manoeuvre at a junction to the system, the method further comprising uploading the navigation instruction to a central navigation instruction database of the navigation system, the method further comprising downloading the navigation instruction from the central navigation instruction database to another user.

In accordance with yet another aspect of the invention there is provided a system for obtaining and providing navigation instructions in a navigation system, the system comprising;

a navigation apparatus via which a user may provide a navigation instruction for use in the navigation system a navigation instruction for a manoeuvre at a junction, a central navigation instruction database, the navigation apparatus being operable to enable the user to upload the navigation instruction to the central navigation instruction database, the system further comprising a central server operable for downloading the navigation instruction from the central navigation instruction database to a different navigation apparatus.

The present invention in these further aspects may include any or all of the features described in relation to the other aspects and embodiments of the invention to the extent that they are not mutually exclusive.

It will be appreciated in accordance with the invention in any of its aspects or embodiments, the navigation instruction provided to another user may be in the same form as the instruction provided by the first user or may be in a different format. For example, the system may pass on an audio file comprising the instruction to the other user or a navigation apparatus of the user with their original voice recording or the instruction may be converted to a text format if not provided in that form, and then provided as an audio file based on a synthesised voice. A receiving user may be offered the opportunity to choose a generic or original voice.

It will be appreciated that in preferred embodiments a central navigation instruction database may be provided which comprises navigation instructions obtained from a plurality of different users. In practice more than one user may provide instructions in respect of the same manoeuvre at a junction. Other users may then select which navigation instructions they wish to use based on desired criteria.

In some embodiments the method further comprises downloading to a user a set of one or more navigation instructions from the central navigation instruction database meeting one or more criteria specified by the user. A central controller may perform the step of downloading the set of one or more navigation instructions to the user. The step of downloading the set of one or more navigation instructions to the user may comprise downloading the instructions to an apparatus e.g. navigation apparatus of the user. The downloading may be in relation to a set of navigation instructions for a planned e.g. calculated route, a predefined area or otherwise. Thus in accordance with any of the embodiments described above or below for providing navigation instructions from a central navigation instruction database to a user the navigation instructions may be navigation instructions meeting one or more criteria specified by a user.

It is believed that such embodiments of the invention are advantageous in their own right, and from a further aspect, the present invention provides a method of providing navigation instructions in a navigation system, the method comprising storing navigation instructions in a central navigation instruction database, and downloading to a user a set of one or more navigation instructions from the central navigation instruction database meeting one or more criteria specified by the user. Each navigation instruction is a navigation instruction for a manoeuvre at a junction.

In accordance with yet another aspect, the present invention provides a system of providing navigation instructions in a navigation system, the system comprising a central navigation instruction database, the system comprising means for downloading to a user a set of one or more navigation instructions from the central navigation instruction database meeting one or more criteria specified by the user.

The present invention in these further aspects may include any or all of the features described in relation to the other aspects and embodiments of the invention to the extent that they are not mutually exclusive.

In accordance with the invention in any of its aspects and embodiments, the method may further comprise receiving from a user one or more criteria to be met by a set of one or more navigation instructions to be downloaded to the user.

In any of these aspects or embodiments of the invention in which the navigation instructions downloaded are instructions which meet specified criteria, the one or more criteria are user specified. The one or more criteria may be specified by an input of the user e.g. to a navigation apparatus, or may be any criteria which results from the user, not necessarily in response to a specific input of a user. For example, a user may customise settings of a navigation apparatus or user account to specify criteria which should always be used when downloading navigation instructions, and may not specifically indicate a criteria for a particular download operation. In embodiments, the criteria are input by or otherwise result from the user.

The criteria may be of any suitable type. In order for navigation instructions to be selected from the database meeting the one or more user specified criteria, each navigation instruction in the database may be associated with additional information to enable suitable instructions to be selected. In any of the embodiments in which a navigation instruction is associated with additional information such information may have been provided by the user who provided the instruction and/or may be obtained through feedback from other users who have downloaded and used the instructions.

One criteria may be an identity of the user who provided the or each navigation instruction. Accordingly, in embodiments a or each navigation instruction stored in the central navigation instruction database may be associated with information identifying the user who provided the instruction. For example a navigation instruction may be associated with a username of the instruction provider.

Another criteria may be a rating of the or each navigation instruction. A criteria may specify that the rating is above a given threshold. In embodiments a or each navigation instruction stored in the central navigation instruction database is associated with rating information. The rating may be a rating specific to the instruction and/or may be a rating of a user that provided the instruction. It will be appreciated that multiple users of the system may download and use any particular navigation instruction. In some embodiments they may be invited to provide a rating for the instruction or an instruction provider. Rating information for individual instructions may be used to determine an overall rating for a given instruction provider. Thus in some embodiments the method may comprise obtaining rating information for navigation instructions in the database from users of the instructions and associating rating information with respective navigation instructions in the database. The rating may be as to how useful the instruction is.

Other criteria may relate to the type of the navigation instruction. A criteria may be in relation to a category of the navigation instruction, the nature of visual cue referred to by the navigation instruction e.g. whether it is a landmark, street name, directional sign etc, a target user for the instruction e.g. a tourist or someone familiar with the locality, a level of detail, a tone e.g. serious or not serious of the instruction etc. In embodiments a or each navigation instruction in the central navigation instruction database is associated with corresponding information relating to a type of the navigation instruction.

Another criteria might specify that certain classes of navigation instruction or parts thereof are or are not to be downloaded. As mentioned above a navigation instruction or part thereof may be associated with one or more labels. A criteria may specify that parts of instructions relating to detour options are or are not to be downloaded.

In accordance with any of the embodiments of the invention in which navigation instructions are provided from a central navigation instruction database to a user, the set of one or more instructions may be provided e.g. downloaded to the user or an apparatus e.g. navigation apparatus of the user in response to a request from the user or apparatus. For example, the user may decide that they wish to download a new set of navigation instructions to be used when travelling in a predefined area, rather than using the default navigation instructions which may otherwise be provided by their navigation apparatus. In other embodiments, an apparatus e.g. navigation apparatus may automatically download a set of navigation instructions for a planned route from the central navigation instruction database.

In some embodiments the method further comprises a navigation apparatus planning e.g. calculating a route, and obtaining e.g. downloading a set of one or more navigation instruction associated with one or more manoeuvres at a junction along the planned route from the central navigation instruction database. The method may further comprise the navigation apparatus providing the navigation instruction to a user travelling along the planned route. The user is another user to the user or users who provided the navigation instructions to the database, and the navigation apparatus is another apparatus to that via which the instruction was provided (in embodiments in which the instruction is provided in this way). The method may comprise using information associated with the navigation instruction and indicating a distance from a junction at which the navigation instruction is to be provided to determine a timing for providing the navigation instruction to a user. The navigation apparatus may carry out this step. The method may comprise the navigation apparatus providing the navigation instruction to a user when a current position of the user is at the indicated distance from the junction. The navigation apparatus may obtain navigation instructions on a manoeuvre by manoeuvre basis e.g. "on the fly". However, in preferred embodiments the navigation apparatus obtains e.g. downloads a set of navigation instructions for manoeuvres along a calculated route from the central navigation instruction database. The set of navigation instructions may be for all manoeuvres along the planned route. Preferably only navigation instructions for manoeuvres along the calculated route are obtained e.g. downloaded.

In other embodiments, rather than obtaining navigation instructions in respect of a planned route, a navigation apparatus may obtain navigation instructions in respect of, and preferably only in respect of, manoeuvres at junctions within a predefined area from the central navigation instruction database, and the method extends to providing or downloading such instructions to a user or navigation apparatus. For example, a user may decide that rather than using predefined navigation instructions provided by the navigation provider, they wish to use user provided navigation instructions when travelling in a predefined area. The navigation apparatus may then use the obtained navigation instructions when guiding the user along a route including a junction in the predefined area.

In accordance with a further aspect of the invention there is provided a method of providing navigation instructions in a navigation system comprising the steps of;

providing a central navigation instruction database, the database comprising a plurality of navigation instructions, each navigation instruction being for a manoeuvre at a junction, downloading a set of one or more navigation instructions from the database to a navigation apparatus, wherein the method comprises downloading a set of navigation instructions which consists only of navigation instructions in respect of manoeuvres along a planned route, or in respect of manoeuvres in a predefined area.

In accordance with a further aspect of the invention there is provided a navigation system comprising, a central navigation instruction database, the database comprising a plurality of navigation instructions, each navigation instruction being for a manoeuvre at a junction,
and means for downloading a set of one or more navigation instructions from the database to a navigation apparatus, wherein the set of navigation instructions downloaded consists only of navigation instructions in respect of manoeuvres along a planned route, or in respect of manoeuvres in a predefined area.

The present invention in these further aspects may include any or all of the features described in relation to the other aspects and embodiments of the invention to the extent that they are not mutually exclusive.

Accordingly, in these embodiments, the set of navigation instructions downloaded may be in respect of manoeuvres along a planned or predetermined route. The route is preferably a route calculated by the navigation apparatus. In other embodiments the instructions downloaded are in respect of manoeuvres in a predefined area. The predefined area may be an area defined by a user of the navigation apparatus. The predefined area may be an sub area of an area for which navigation instructions are stored.

The principles of the present invention are applicable to any form of navigation apparatus. In accordance with any of the aspects or embodiments of the invention any navigation apparatus referred to herein may comprise a display for displaying a digital map to a user and a processor configured to access digital map data and cause a digital map to be displayed to a user via the display. The apparatus may further comprise a user interface operable by a user to enable the user to interact with the apparatus.

One particular area of utility is in relation to portable navigation devices (PND). In embodiments, therefore, the navigation apparatus is an apparatus of a portable navigation device (PND). In accordance with a further aspect, the navigation apparatus referred to in the aspects and embodiments of the invention above is a portable navigation device (PND).

The invention is also applicable to navigation apparatus which is provided as part of an integrated navigation system. For example the apparatus may form part of an in-vehicle integrated navigation system.

Regardless of its implementation, as discussed above a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented by means of an application of a processing device which does not form part of a specific navigation device. For example the invention may be implemented using a suitable computer system arranged to execute navigation software. The system may be a mobile or portable computer system e.g. a mobile telephone or laptop, or may be a desktop system.

The present invention extends to a computer program product comprising computer readable instructions executable to perform a method according to any of the aspects or embodiments of the invention, or to cause a navigation system or apparatus to perform such methods.

The present invention extends to a computer program product comprising computer readable instructions executable when run on a navigation apparatus in accordance with any of the embodiments of the invention to cause a set of one or processors of the navigation apparatus or system to perform the steps of the methods of any of the aspects or embodiments of the invention.

It will be appreciated that any of the further aspects of the invention may include any or all of the features of the invention described in relation to any other aspects and embodiments of the invention to the extent they are not mutually inconsistent therewith.

The "junction" referred to herein may be any decision point along the route. Examples of decision points include roundabouts, crossings, road intersections or interchanges etc. The "junction" may be a lane level or road level junction.

It is envisaged that while in preferred embodiments the navigation instruction is in respect of a manoeuvre at a junction, the invention is not limited thereto. For example, the user could provide an instruction where there may be ambiguity as to the path to take, or in respect of a lane manoeuvre not specifically required to follow a route. Thus in its broadest terms, the manoeuvre may be a manoeuvre at a point in a road network.

The term "manoeuvre" may take on its usual meaning in the art. The manoeuvre may be a lane manoeuvre or a road level manoeuvre. The manoeuvre may include carrying on straight at a decision point. In some embodiments a manoeuvre comprises at least three consecutive shape points or junctions spatially associated within a coordinate system.

The term "digital map database" refers to any kind of electronic or digital map or set of map data. For example, a digital map database may be any set of geospatial information. The term "database" does not imply any particular structure between database entries or a database manager coordinating the database. In some embodiments a digital map database may comprise a set of geographical objects and a set of vectors, representing (parts of) roads, connecting geospatial objects.

Advantages of these embodiments are set out hereafter, and further details and features of each of these embodiments are defined in the accompanying dependent claims and elsewhere in the following detailed description.

BRIEF DESCRIPTION OF THE DRAWINGS

Various embodiments of the present invention will now be described with reference to the accompanying drawings, in which.

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

Figure 1:
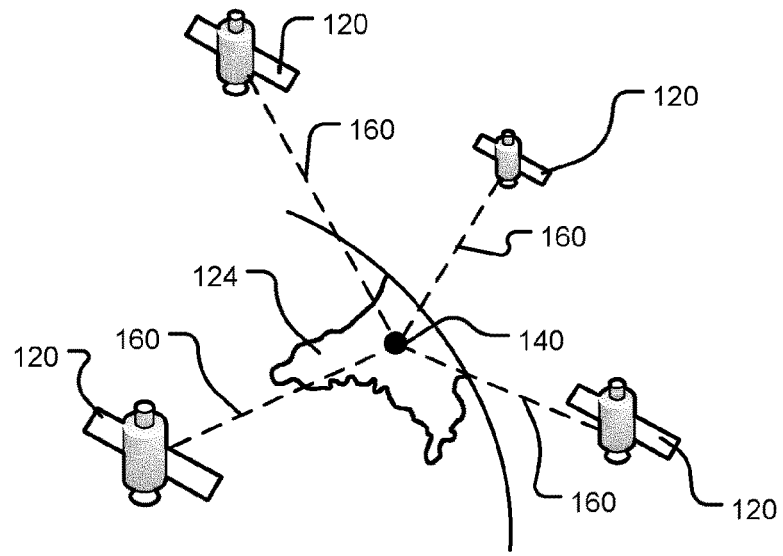
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
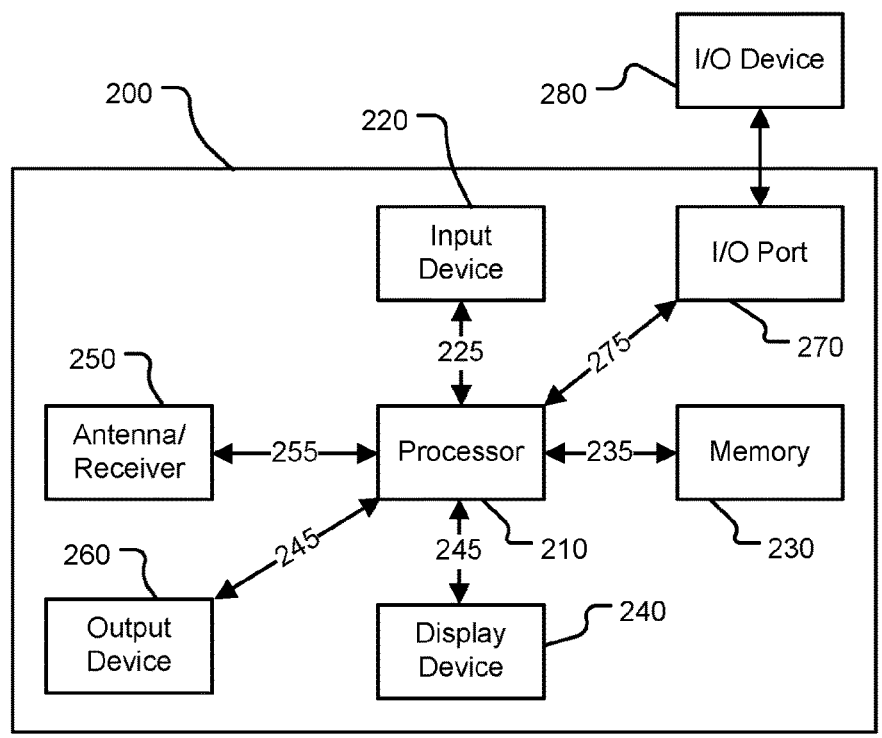
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the Internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
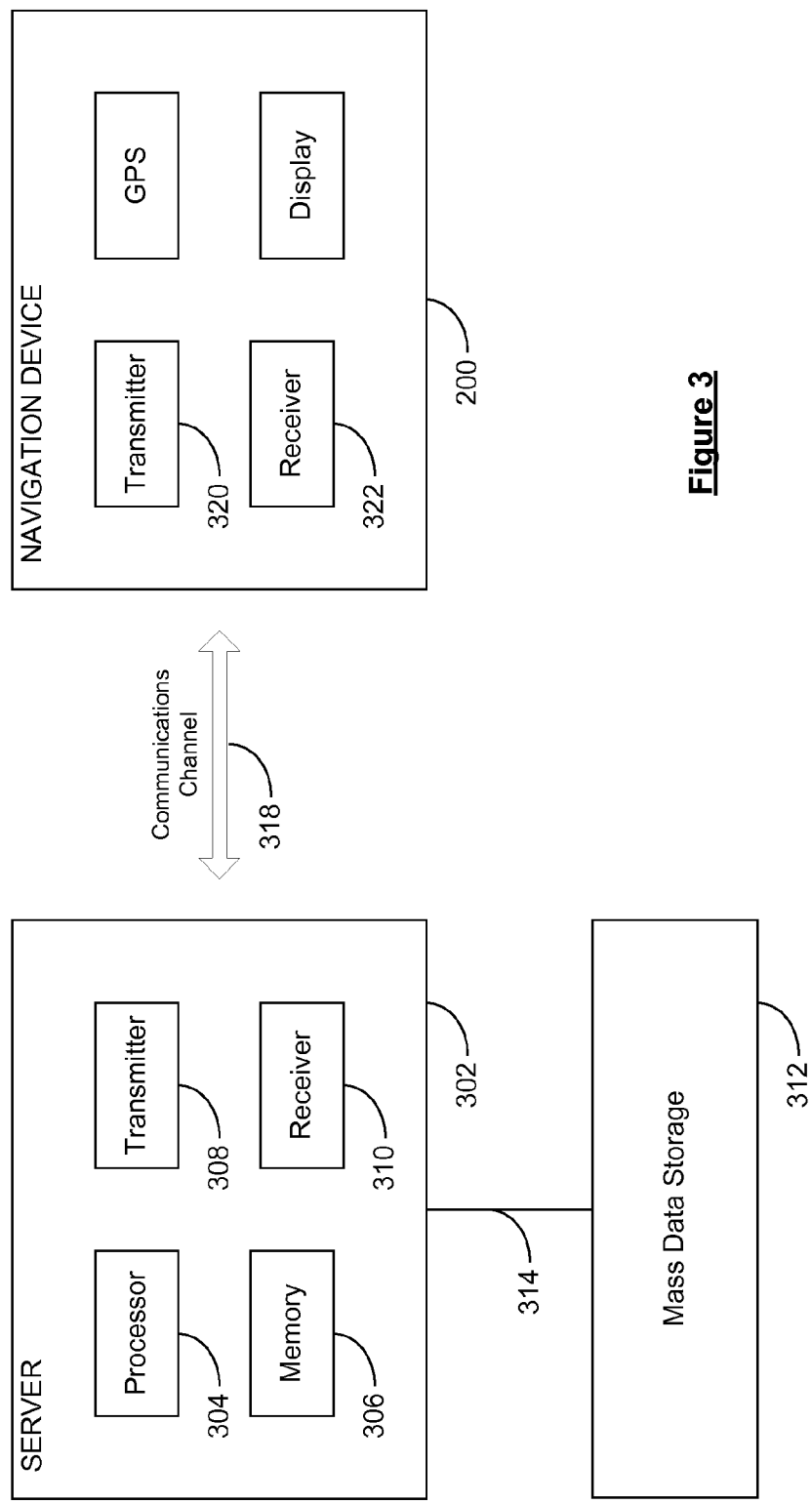
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the Internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
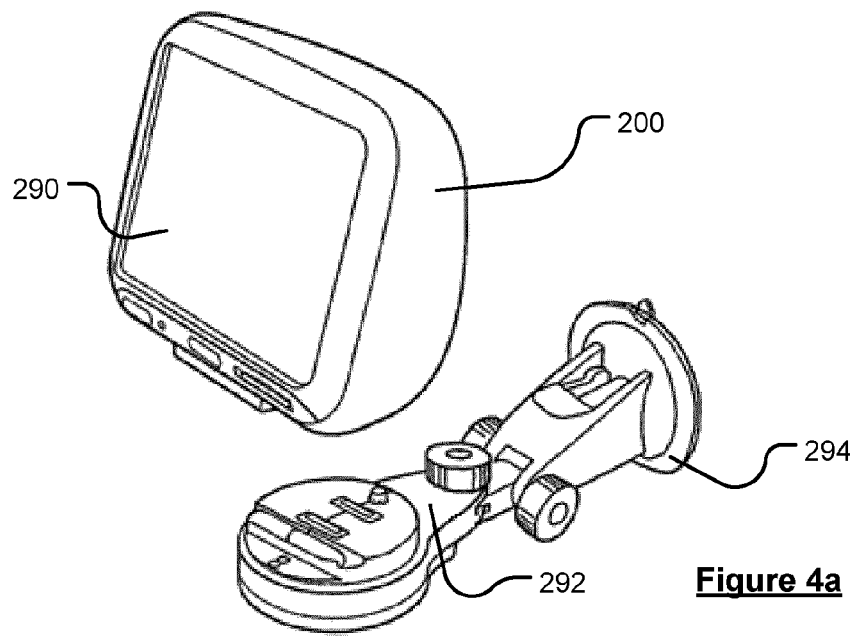
FIGS. 4A and 4B are illustrative perspective views of a navigation device.
Figure 4B:
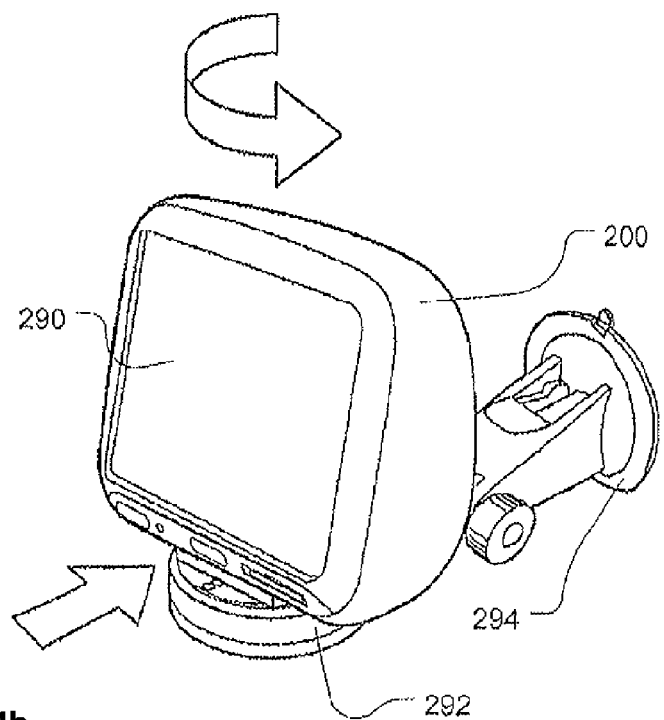

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Some preferred embodiments of the invention will now be described by reference to FIGS. 5 and 6.

In accordance with the invention a method is provided which enables navigation instructions to be obtained which may be more useful to users of the navigation system, and which may be more similar to the kind of instructions a person might provide when describing a manoeuvre to another person ("natural voice instructions"). This is made possible, as, in accordance with the invention, navigation instructions are obtained from users of a navigation system. The users may be users of PNDs of the navigation system or may be users who have signed up to become navigation instruction providers for a given area, in which case they may not necessarily be PND users.

The description below will be given primarily in relation to navigation instructions which are by reference to visual cues. However it will be appreciated that while providing particular advantages in the context of such instructions, the invention is not so limited, and the present invention is applicable to obtaining and using any type of navigation instruction.

One exemplary embodiment of a method by which navigation instructions may be obtained in a navigation system in accordance with the invention will be described by reference to FIG. 5. Various alternative embodiments will then be discussed.

Figure 5:
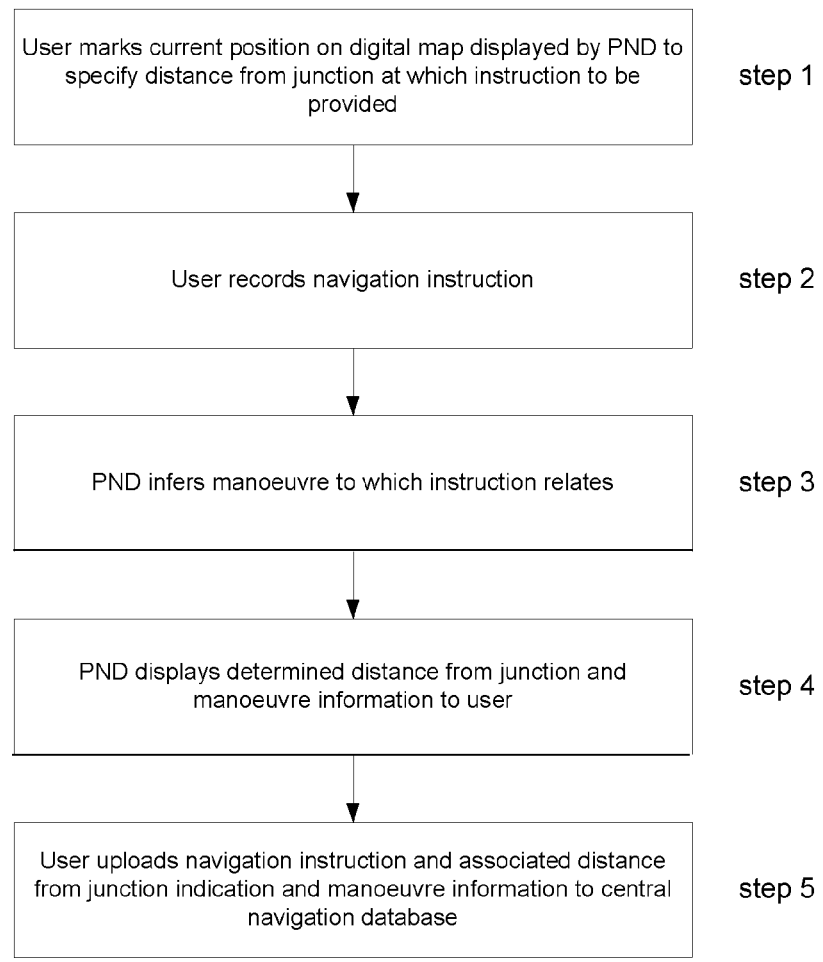
FIG. 5 illustrates the steps involved in a user uploading navigation instructions to a navigation system in accordance with a preferred embodiment of the method of the invention.

FIG. 5 is a flowchart indicating a series of steps which may be used to obtain a navigation instruction for a manoeuvre at a junction in accordance with one preferred embodiment of the invention.

In the embodiment of FIG. 5, the user records a navigation instruction for a manoeuvre at a junction while they are out driving around in their local area, via a PND in their vehicle. The user may first put their PND into a particular mode in which it is ready to receive navigation instructions, and in which functionality is enabled to allow the user to input the necessary associated information.

The PND is first set to follow a calculated route. The route will include junctions at which manoeuvres must be performed in order to follow the route. In accordance with the invention the user records navigation instructions for use at these points. The user may be prompted to record an instruction by the PND providing a conventional navigation instruction as a junction is approached. However, the user has the freedom to provide an instruction wherever they feel this may be helpful. This may not be in the same place as a conventional instruction would be provided which is typically based on a distance from a junction as determined using digital map data, without taking into account the actual appearance of the area. A human user may realise that there is scope for confusion unless an instruction is provided at a certain point e.g. before or after a side road.

At step 1 the user reached a position before a junction at which they feel it would be appropriate to give someone an instruction regarding the manoeuvre to be performed. The user provides an input to the PND to mark their current position in the digital map at this point. This position is taken as marking the distance relative to the junction at which the navigation instruction should be provided, and is associated with the recorded instruction.

The user then, in step 2, records a desired navigation instruction. The instruction is a spoken instruction and is recorded in the form of an audio file by the user using the PND. The instruction is a visual cue based instruction. For example the instruction might state "At the large brick church turn right". It will be appreciated that steps 1 and 2 could occur in either order, or simultaneously.

The PND now has been received the desired navigation instruction, and an indication of a distance from the junction at which the navigation instruction should be provided. The PND may convert this indication of a position into another form e.g. a distance to the junction if desired.

In order for the navigation instruction to be useful in a navigation system it is also necessary to identify the manoeuvre to which it relates. In step 3 the PND infers the manoeuvre to which the navigation instruction relates as being the next manoeuvre to be performed in order to follow the calculated route. This may be obtained by the PND by reference to the details of the calculated route that is being followed at the time the navigation instruction is recorded. The PND might determine a manoeuvre in other ways. For example, alternatively, the PND could be set up to always take a previous manoeuvre as that to which the instruction relates, or, if only no future manoeuvre is planned within a given distance, might then by default take a previous manoeuvre.

In step 4 the PND displays the inferred manoeuvre to the user together with the distance before the junction at which the instruction is to be provided. The navigation instruction may be replayed or converted to a text form and displayed. The user may then confirm that the details are correct. Alternatively this step could be carried out at a later stage, when the user is at home, reviewing the navigation instructions they are provided during a journey.

Once the user confirms that the information is correct, the user causes the PND to upload the navigation instruction associated with the relevant manoeuvre and the indication of distance to a junction at which the instruction is to be provided, to a central navigation instruction database held by a central server—step 5. The instruction and associated information is uploaded in association with a user identifier. The navigation instruction may then be downloaded by other users of the system to their own different PND for use when following the route as described by reference to FIG. 6.

The user may record a set of navigation instructions for a route, and upload the instructions one at a time, or as a set once they have recorded and reviewed all instructions and associated information. More than one instruction may be provided for a given manoeuvre e.g. to be provided at decreasing distances thereto when different landmarks or signs become visible.

One exemplary embodiment of the way in which the navigation instructions provided and uploaded to a central navigation database by users in the manner described by reference to FIG. 5 may then be downloaded and used by other users will be described by reference to FIG. 6.

Navigation instructions are stored by a central server in a central navigation instruction database—Step 18. The database includes instructions provided by a different users, and may include instructions in respect of many different manoeuvres at junctions, and even multiple instructions fora given manoeuvre.

Figure 6:
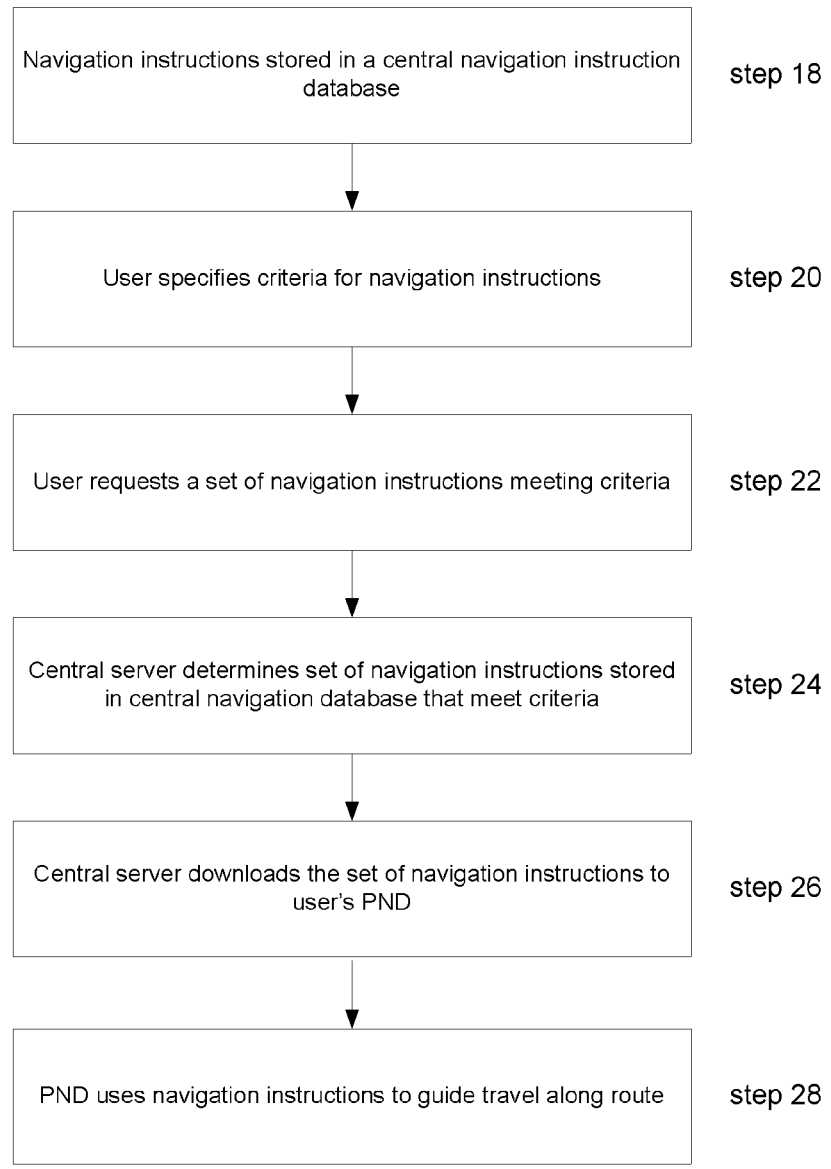
FIG. 6 illustrates the steps involved in a user downloading navigation instructions in a navigation system in accordance with a preferred embodiment of the method of the invention.

In FIG. 6-step 20, a user specifies one or more criteria for a set of navigation instructions that they wish to obtain from the central navigation database. The criteria may be that a rating of the navigation instructions is above a given threshold, or a requirement that the navigation instructions have been provided by a particular user. The criteria may be specified directly by the user, e.g. via an input to their PND or via a user account. The criteria may be specified for a particular occasion e.g. set of downloaded instructions, or the user may have provided default criteria for the PND to use when obtaining navigation instructions meeting certain criteria.

In step 22 the user requests a set of navigation instructions meeting the criteria. A user may request a set of navigation instructions when they wish to obtain an alternative set of navigation instructions for use rather than using default instructions provided by the navigation provider. The user may download a set of instructions for future use, or the instructions may be downloaded in relation to the particular calculated route or predefined area. The download may be carried out using a PND of the user or via another apparatus. Rather than a user specifically requesting the instructions, the instructions may be downloaded automatically by the PND according to user specified criteria in certain circumstances. For example, when set up appropriately, the PND may download a set of instructions according to the criteria from the database whenever it has calculated a route, or during the course of a route if navigation instructions are obtained "on the fly'.

The central server determines a set of navigation instructions meeting the user's criteria in step 24, and in step 26 downloads the set of navigation instructions to the user's PND. This user and the PND will be different to the user and PND involved in uploading the instructions initially. The instructions are downloaded associated with the information regarding the manoeuvre or junction to which they relate and information regarding the distance before the junction where they are to be provided. The instructions may then be stored by the PND for later use or may be used in a current operation of the PND. Of course a download could be carried out via an intermediate apparatus e.g. a PC of the user.

In step 28 the PND uses the downloaded navigation instructions to guide the user along a calculated route. This may be a route in relation to which the instructions were specifically downloaded or another route calculated subsequent to the download. The associated information will enable the PND to determine a timing for providing the instructions and to determine to which manoeuvre they relate.

When the navigation instructions are replayed to another user in step 28, the original recorded navigation instruction may simply be replayed in the original voice as recorded, or if the instruction was converted to text for storing in the navigation instruction database, the transcribed text could be read out by a generic voice as with conventional navigation instruction. It may be possible for a user receiving navigation instructions to specify which voice they would like to read out the instructions.

FIGS. 5 and 6 describe the basic steps of some exemplary methods for uploading and downloading navigation instructions in accordance with embodiments of the invention. However these are merely exemplary methods, and there exist various alternative options.

Considering the method of obtaining the navigation instructions from users described by reference to FIG. 5, rather than a user providing navigation instructions as they drive along a pre-calculated route, a user may simply drive around their neighbourhood and record navigation instructions where they feel these may be useful. It is envisaged that users may sign up to become navigation instruction providers in the navigation system e.g. local guides, and the navigation system provider may provide an indication on a digital map as to junctions and/or manoeuvres where user provided instructions are required. Other users may similarly be able to mark junctions and/or manoeuvres where they feel user provided navigation instructions would be helpful e.g. via their PND or user account in a similar manner to providing map corrections. Of course, any number of users could record instructions for the same manoeuvres and junctions. This will provide greater opportunity for other users to select instructions from the navigation instruction database meeting their personal criteria. Each user will record instructions in their own personal style.

It is believed that users may be motivated to simply go out and record instructions to try to complete instruction sets for their area without any specific incentive. In embodiments in which the instructions are uploaded and used by other users of the system, other users may rate the instructions, and trying to obtain a higher rating or positive feedback may motivate users.

The method would operate in a similar manner to that described in FIG. 5 if the user is not driving along a pre-planned route when providing instructions. However the PND will not be able to infer the manoeuvre to which a recorded navigation instruction relates from the details of a calculated route. Instead the PND might determine the manoeuvre by consideration of the actual travel of the user before and/or after recording of the instruction or marking of the position at which the instruction is to be provided. Alternatively the user may input the manoeuvre information manually when driving around or at a later stage.

While it is described that the navigation instructions are provided as voice instructions by the user, it is envisaged that the instruction could be input simply as text. This would be more appropriate in cases where the user was not driving around when providing the instructions.

In any embodiments of the invention, the recorded navigation instruction may be uploaded to the central server as an audio file, or may first be converted to a text file and the text file uploaded to the server. This could be carried out using suitable voice recognition software and may be carried out by the PND. Other formatting of the recorded navigation instructions may be carried out. For example automatic spelling checkers may be employed to check the syntax. Prior to being added to the database, the navigation instructions might be verified, for example by being published and checked by other users of the system, being added to the database only when they have been validated.

Although less preferred, it is envisaged that a user might be able to create navigation instructions at times other than when driving around. The user could create navigation instructions at their desktop by marking a digital map appropriately to indicate a junction and/or manoeuvre to which the instruction relates, and a distance before the junction at which the instruction should be provided. The user could refer to photos or movies they have taken when out and about to recall features they can refer to in the navigation instructions.

While in the description of the download procedure given by reference to FIG. 5 it is described that the user specifies certain criteria that a set of navigation instructions to be downloaded should meet, this is not essential. In other embodiments the user may specify a predefined area in respect of which they wish to obtain a set of navigation instructions from the central database and then download the set of instructions for that area and no other area. Alternatively the user may download a set of navigation instructions only in respect of a calculated route.

As mentioned above, the methods of the present invention are particularly applicable to obtaining and using navigation instructions which are visual cue-based. This is in contrast to conventional automatically produced instructions which tend to rely on distance, such as "Turn right in 200 meters". Visual cue-based instructions might refer to landmarks, visible street names, direction signs or features of the road, for example the end of a slope or curve. In broad terms navigation instructions may refer to visible cues in the environment, or characteristics of the road or road network. Alternatively, or in addition, instructions may also refer to time or distance in a more conventional manner. It is envisaged that users may be creative in their selection of navigation instructions, and references to use when providing instructions. One example of a navigation instruction would be "You can see a crossing from here. Go left there".

It will be appreciated that in contrast to conventional methods of obtaining visual cue-based navigation instructions using map data, as the instructions are obtained from human users, they will naturally be more useful, and only refer to visible features or objects. For example a map might indicate the presence of a church at a junction. However in practice this may be hard to see due to it being small and covered by trees. A user will not refer to the church when formulating instructions. Conventional techniques for providing visual cue-based instructions may refer to the name of a street the driver should turn into or might be based on an assumption about text written on direction indication signs. Both of these techniques may be problematic, due to lack of visibility of street name signs, or lack of knowledge as to what text is actually written on a direction indication sign. Again a human user will naturally only refer to street names which are actually visible, and will know what information is visible to a driver on a direction indication sign. Furthermore the user will be able to determine the most useful way of formulating a navigation instruction, such as whether to refer to a landmark direction sign or street name.

It is envisaged that a user may record a set of navigation instructions for a particular manoeuvre, which are relevant at decreasing distances to the junction. This may be particularly useful with difficult turnings. For example at 1793 meters from a junction, the user may consider that an early instruction might be useful and record an instruction such as "At the next crossing you will get a difficult turn to the left. There will be no dedicated lane for you and you need to give way to all other traffic. [ If you want a safer route, take the first right instead]." In this case the latter bracketed statement referring to an alternative route might be tagged as being a detour option. At 423 meters from the junction the user may provide an instruction stating "You can see the crossing here. Go left there, [or go to the right and take a detour of 2.4 kilometers]." The latter bracketed detour option is again tagged as a detour option. The system may be arranged such that a user might be able to disable any information which is specifically tagged as relating to an alternative route or detour. This could be achieved by saving the navigation instruction with the tags in the navigation instruction database, and users specifying via their criteria whether they wish to receive detour options.

In a similar way a user may tag part of an instruction which provides additional information such as historical information, jokes etc., which are not essential to imparting the navigation detail. A user receiving the instruction may then disable the tagged portions or certain categories of tagged information.

Other information may be provided by a user and associated with navigation instructions. Such information may be stored in association with the instruction in the central navigation instruction database. The information may be used to select navigation instructions from the database according to user criteria as described in FIG. 6.

In some situations a navigation instruction might not be valid at all times. For example a navigation instruction may refer to a landmark which might not be visible in all seasons, such as when leaves are on trees. The user should try to take this into account when creating instructions. However to overcome this preferred embodiments the user may additionally set validity tags to recorded navigation instructions. These may indicate when the instructions are valid, by reference to a season, time of day, e.g. daytime only, or also based on other conditions such as weather conditions. A navigation instruction referring to a distant landmark such as mountains might only be valid on a clear day. The user may also mark a positional validity of a navigational instruction or a feature such as a landmark referred to therein. As well as providing an indication as to the distance from the junction where the indication should be provided the user may mark all positions, or at least all positions on roads from which a feature referring to the instruction may be seen.

The user may also indicate a character of a type of the navigation instruction i.e. whether it refers to a road sign landmark, street name or direction indication.

Other information might relate to a level of detail or a target audience of the navigation instruction. For example a user might record an instruction that is appropriate to tourists, including information about local sites. Such an instruction may be less relevant to local based users. A user might provide additional detail in some instructions which would be more appropriate to certain classes of the user or those who have expressed a preference for obtaining more detailed instructions. Thus the user may provide a detail level for the instruction.

Other information might relate to a level of entertainment or seriousness of the instruction.

Rather than being provided by the user who uploads the instruction it is envisaged that some of this information, particularly levels of entertainment/seriousness, level of detail, target audience etc., might be provided once the instruction has been uploaded to the central database by other users based on their experience in using the instruction. This may be achieved in a similar manner to providing ratings as described below.

In embodiments a recorded navigation instruction may be provided with a time stamp at the time of recording. This may enable the system to automatically assign a validity to the instruction, such as valid during daytime if the instruction was recorded at this time.

In the embodiments as shown in FIG. 6 in which other users subsequently download and use navigation instructions provided by a user they may be invited to provide a rating as to how useful they found the instructions. This may be used to provide an overall rating to the navigation instruction provider. The ratings may be associated with navigation instructions stored in the central navigation database. In this way users wishing to obtain navigation instructions may specify that they only wish to receive instructions having a rating above a given threshold, or from a selected provider. It is envisaged that instructions could be rated indirectly by determining via PNDs of users whether they appear to lose their calculated route when following the instruction. Other criteria used in the step 20 of FIG. 6 might relate to the level of detail of the instructions, level of entertainment/seriousness, and the type of feature to which the instructions refer. Criteria may also be set to determine whether certain categories of tagged information e.g. detour options or jokes are downloaded.

It is envisaged that navigation instruction providers could form a community, and may interact with each other and with users for example via a website. Users may themselves mark locations where further instructions may be useful, and PNDs might be provided with a suitable functionality to enable them to do this. Other users may then see that an instruction is required and go out and provide one. Users may have a better understanding as to where further instructions are needed, from their own experience, such as where exits of a highway are difficult to find.

While it is particularly preferred that the navigation instructions provided by users should be uploaded to a central navigation database to enable them to be used by other users of the system, it is envisaged that a user might record navigation instructions for their personal use only to replace predefined navigation provider instructions. In this situation, rather than uploading the instruction and associated information to a central navigation instruction database, the navigation instruction may be stored locally such as on a memory of the PND of the user.

The invention claimed is:

1. A method for obtaining navigation instructions for use in a navigation system, the method comprising:
   receiving, by a navigation apparatus, a navigation instruction that is provided by a user for a manoeuvre at a junction, the navigation instruction being a complete instruction regarding an action to be taken in order to perform the manoeuvre at the junction;
   downloading, by the navigation apparatus, from a central navigation instruction database at a central server, one or more user-provided navigation instructions, each of the one or more user-provided navigation instructions being a complete instruction regarding an action to be taken in order to perform a given manoeuvre at a corresponding junction; and providing, to the user, by the navigation apparatus, the one or more user-provided navigation instructions regarding the actions to be taken in order to perform the given manoeuvres at the corresponding junctions.

2. The method of claim 1, wherein the navigation instruction is a spoken instruction, wherein the step of the user providing the instruction comprises the user recording a spoken instruction.

3. The method of claim 1, wherein the navigation instruction is associated with at least one of: i) a manoeuvre defined in a digital map, and ii) an indication as to a distance before the junction at which the navigation instruction should be given.

4. The method of claim 1, wherein the user provides the navigation instruction while travelling along route planned by the navigation apparatus.

5. The method of claim 4, further comprising the navigation apparatus determining one or both of a manoeuvre defined in a digital map and an indication as to a distance before the junction at which the navigation instruction should be given to be associated with the navigation instruction on the basis of an input or inputs of the user and/or the planned or actual movement of the user.

6. The method of claim 4, comprising the user providing an input to a navigation apparatus when a current position corresponds to the distance before the junction at which the navigation instruction is to be given to thereby indicate the distance before the junction at which the instruction is to be given for association with the navigation instruction.

7. The method of claim 6, further comprising the navigation apparatus inferring the manoeuvre with which the navigation instruction is to be associated using the indicated current position and a planned route being followed by the user.

8. The method of claim 1, wherein the navigation instruction is associated with one or more validity criteria, and wherein the validity criteria include one or more of temporal, environmental or positional validity criteria.

9. The method of claim 1, wherein the navigation instruction is associated with information identifying the user who provided the instruction.

10. The method of claim 1, wherein said navigation instruction refers to a landmark, street name or a road sign.

11. The method of claim 1, further comprising uploading said navigation instruction to the central server of the navigation system and storing the navigation instruction centrally in the central navigation instruction database so as to be accessible to other users of the navigation system.

12. The method of claim 11, further comprising downloading a set of one or more navigation instructions including the navigation instruction from the central navigation instruction database to at least one other user of the navigation system.

13. The method of claim 12, wherein the navigation instruction is downloaded to a navigation apparatus of the other user, the navigation apparatus being different to the navigation apparatus via which the navigation instruction was provided to the navigation system.

14. The method of claim 13, further comprising the navigation apparatus of the other user using the downloaded set of one or more navigation instructions to guide the user along a planned route.

15. The method of claim 12, wherein the set of one or more navigation instructions downloaded is a set of navigation instructions in respect of manoeuvres along a calculated route or in respect of manoeuvres in a predefined area.

16. The method of claim 12, wherein the set of one or more navigation instructions downloaded meet one or more criteria specified by the other user.

17. A non-transitory computer program product comprising computer readable instructions which, when executed on one or more processors, cause the one or more processors to perform a method according to claim 1.

18. A method of providing navigation instructions in a navigation system, the method comprising:

storing navigation instructions in a central navigation instruction database, each navigation instruction being a complete user-supplied instruction regarding an action to be taken by a user in order to enable the user to perform a corresponding manoeuvre at an associated junction, and downloading to a user a set of one or more navigation instructions from the central navigation instruction database meeting one or more criteria specified by the user, each navigation instruction of the one or more navigation instructions being a complete instruction regarding an action to be taken in order to perform a given manoeuvre at a corresponding junction.

19. The method of claim 18, wherein the one or more criteria include criteria relating to one or more of an identity of the user who provided the navigation instruction, a rating of the navigation instruction, or a type or category of the navigation instruction.

20. A non-transitory computer program product comprising computer readable instructions which, when executed on one or more processors, cause the one or more processors to perform a method according to claim 18.

21. A system for obtaining and providing navigation instructions in a navigation system, the system comprising:

a navigation apparatus via which a user provides a navigation instruction for a manoeuvre at a junction for use in the navigation system, the navigation instruction being a complete instruction regarding an action to be taken by a user in order to enable the user to perform the manoeuvre at the junction;

a central navigation instruction database, the navigation apparatus being operable to enable the user to upload the navigation instruction to the central navigation instruction database; and a central server operable for downloading the navigation instruction from the central navigation instruction database to a different navigation apparatus, the navigation instruction being the complete user-provided instruction regarding the action to be taken by an other user of the different navigation apparatus in order to perform the manoeuvre at the junction.

22. The system of claim 21, wherein the navigation apparatus is a portable navigation device (PND) or an integrated navigation device.

* * * * *